US008069128B2

(12) United States Patent
Pujara

(10) Patent No.: US 8,069,128 B2
(45) Date of Patent: Nov. 29, 2011

(54) REAL-TIME AD-HOC SPAM FILTERING OF EMAIL

(75) Inventor: Jay Pujara, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 636 days.

(21) Appl. No.: 12/188,612

(22) Filed: Aug. 8, 2008

(65) Prior Publication Data

US 2010/0036786 A1 Feb. 11, 2010

(51) Int. Cl.
G06F 17/00 (2006.01)
G06N 5/02 (2006.01)
(52) U.S. Cl. .......................................... 706/46
(58) Field of Classification Search .................. None
See application file for complete search history.

(56) References Cited

U.S. PATENT DOCUMENTS

| | | | |
|---|---|---|---|
| 6,052,709 A | 4/2000 | Paul | |
| 6,393,465 B2 | 5/2002 | Leeds | |
| 6,415,318 B1 | 7/2002 | Aggarwal et al. | |
| 6,421,709 B1 | 7/2002 | McCormick et al. | |
| 6,453,327 B1 | 9/2002 | Nielsen | |
| 6,643,686 B1 | 11/2003 | Hall | |
| 6,650,890 B1 | 11/2003 | Irlam et al. | |
| 6,772,196 B1 | 8/2004 | Kirsch et al. | |
| 6,957,259 B1 | 10/2005 | Malik | |
| 7,120,455 B1 | 10/2006 | Chen et al. | |
| 7,257,842 B2 | 8/2007 | Barton et al. | |
| 7,373,385 B2 | 5/2008 | Prakash | |
| 7,577,709 B1* | 8/2009 | Kolcz | 709/206 |
| 2003/0140103 A1 | 7/2003 | Szeto et al. | |
| 2004/0177110 A1 | 9/2004 | Rounthwaite et al. | |
| 2004/0255122 A1 | 12/2004 | Ingerman et al. | |
| 2005/0075921 A1* | 4/2005 | Hayes-Roth | 705/10 |
| 2007/0112954 A1 | 5/2007 | Ramani et al. | |
| 2007/0192863 A1 | 8/2007 | Kapoor et al. | |
| 2007/0239639 A1* | 10/2007 | Loughmiller et al. | 706/20 |
| 2009/0019158 A1* | 1/2009 | Langen et al. | 709/226 |

OTHER PUBLICATIONS

"Bloom Filter," Wikipedia, the free encyclopedia, 7 pgs., http://en.wikipedia.org/wiki/Bloom_filter (accessed May 22, 2007).
Dhamija, Rachna, "Security Skins: Embedded, Unspoofable Security Indicators," Jun. 19, 2006, 57 pgs., Harvard University.
Dhamija, Rachna et al., "Why Phishing Works," Apr. 2006, 10 pgs.
Dhamija, Rachna et al., "The Battle Against Phishing: Dynamic Security Skins," Jul. 2005, 12 pgs.

(Continued)

Primary Examiner — Jeffrey A Gaffin
Assistant Examiner — Luis Sitiriche
(74) Attorney, Agent, or Firm — Frommer Lawrence & Haug LLP; Jamie L. Wiegand

(57) ABSTRACT

Embodiments are directed towards employing a multi-pass ad-hoc spam message filtering approach that dynamically generates a temporary classifier during a first pass based on a result of a previously applied message filter that sorts messages into various folders for a user. The first pass scans messages in a user's mail folders, and reads various information within the messages, including, but not limited to sender information, headers, including a subject, an originating network address, message contents, attachments, and the like. After creating a classification model, the classifier with its model is used in a second pass on the message folders to retrospectively inspect the messages and present to the user a list of messages that might be misclassified. The classification model is maintained within memory on a user's client device, as memory resident only, and is not stored on disk or within another persistent data store.

20 Claims, 4 Drawing Sheets

OTHER PUBLICATIONS

Registration Demonstration; Sign-in From New Device Sign-in Demonstration, 20 pgs., http://passmarksecurity.breezecentral.com/p70238971 (accessed Jun. 13, 2006).

Kristol, D. et al., "HTTP State Management Mechanism," Feb. 1997, 21 pgs., Network Working Group.

Taylor, Bradley, "Sender Reputation in a Large Webmail Service," 6 pgs., Google Inc., Jul. 27-28, 2006.

Taylor, Bradley, "Sender Reputation in a Large Webmail Service CEAS 2006," Jul. 27, 2006, 19 pgs., Google Inc.

"Antivirus software," Wikipedia, the free encyclopedia, 4 pages, http://en.wikipedia.org/wiki/Virus_scanner, (accessed Nov. 27, 2007).

Iwanchuk, Russ, FindArticles—"IM Anti-Virus and IM Message Inspector," http://findarticles.com/p/articles/mi_zdpcm/is_200106/ai_ziff2220/print, p. 1 of 1, Oct. 29, 2007.

"Malware," Wikipedia, the free encyclopedia, 8 pages, http://en.wikipedia.org/wiki/Malware, (accessed Nov. 27, 2007).

"Instant messaging," Wikipedia, the free encyclopedia, 7 pages, http://en.wikipedia.org/wiki/Instant_messaging, (accessed Nov. 27, 2007).

International Search Report and Written Opinion, mailed Jan. 31, 2006 for Patent Application PCT/US04/35402 filed on Oct. 26, 2004.

Slashdot, FAQ—Comments and Moderation#cm600, http://slashdot.org/fq.com-mod.shtml, pp. 1-18, Nov. 15, 2007.

Flickr Community Guidelines, http:/flickr.com/guidelines.gne, pp. 1-3, Nov. 15, 2007.

Craigslist online community, craigslist help > flags and community moderation, http://www.craigslist.org/about/help/flags_and_community_moderation, updated Nov. 7, 2007.

* cited by examiner

REAL-TIME AD-HOC SPAM FILTERING OF EMAIL

TECHNICAL FIELD

The present invention relates generally to managing messages over a network and, more particularly, but not exclusively to performing a multi-pass ad-hoc analysis upon previously filtered messages to retrospectively inspect sorted messages and present a user with a list of messages that might be misclassified.

BACKGROUND

The problem of spam is well-recognized in established communication technologies, such as electronic mail. Spam may include unsolicited messages sent by a computer over a network to a large number of recipients. Spam includes unsolicited commercial messages, but spam has come to be understood more broadly to additionally include unsolicited messages sent to a large number of recipients, and/or to a targeted user or targeted domain, for malicious, disruptive, or abusive purposes, regardless of commercial content. For example, a spammer might send messages in bulk to a particular user to harass, or otherwise, disrupt their computing resources.

However, a sender of a large number of messages might not be considered a spammer. For example, an educational, financial institution, health institution, or the like, might send a large number of messages to its alumni, members, or the like. Similarly, known and/or generally acceptable merchants might send large number of messages that some recipients may actually want to receive. Such bulk message distributors may be well known by some of its recipients, who may actually seek to receive the messages. Thus, a sender of a large number of messages cannot be classified based solely upon the quantity of messages it sends. However, in other situations, even messages from well known merchants might be considered as junk mail, or spam, by other recipients. Because some recipients of the bulk messages may know and accept messages from these senders, while other recipients would consider such messages as spam, filters often need to be individually tuned to allow the messages to be delivered for each individual. Thus, while some generic spam filters may work for many messages, they may not work for a given individual.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
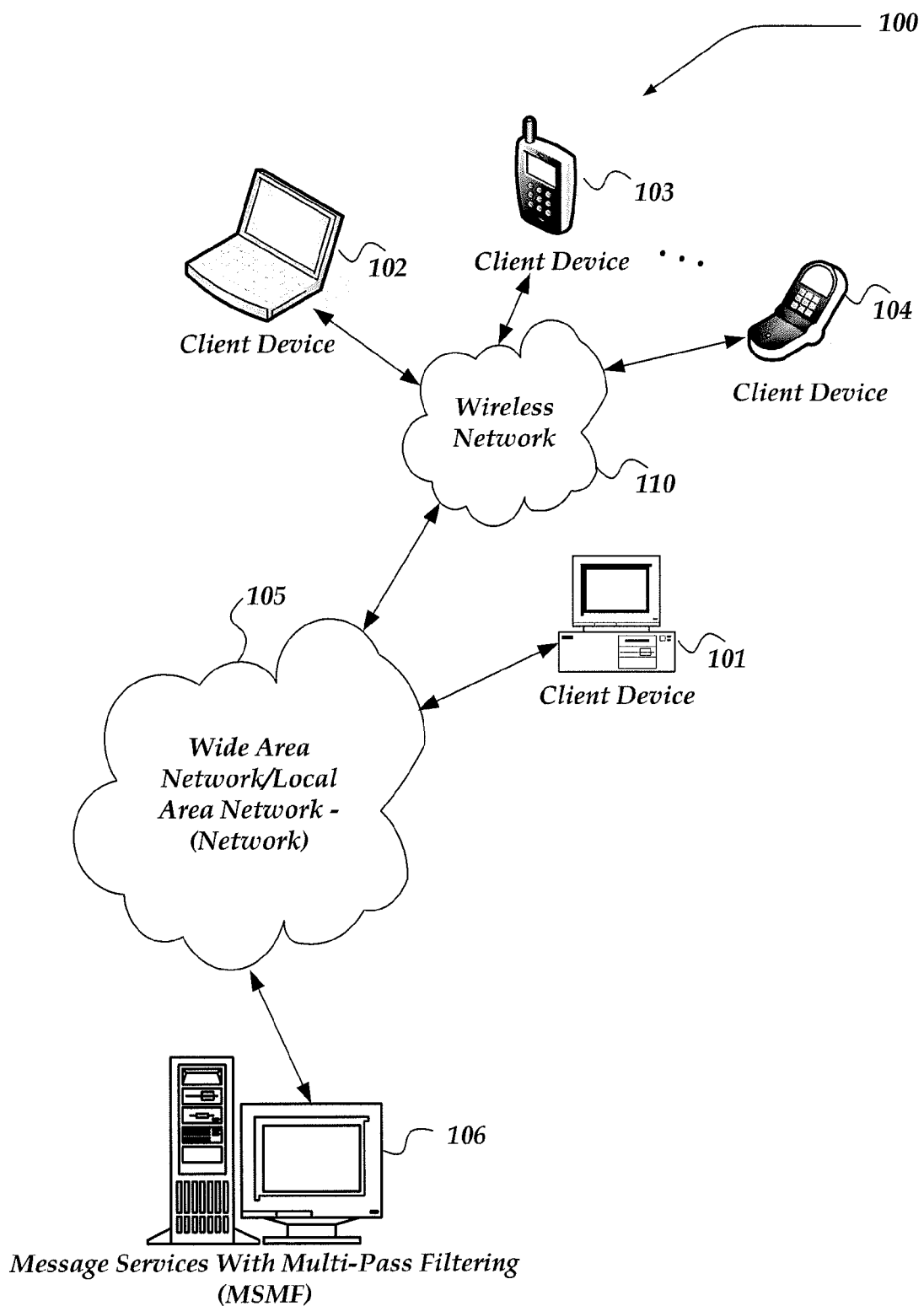
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "classifier" refers to any of a variety of message organization mechanisms useable to receive messages and to organize the messages based on some defined criteria. As used herein, the classifiers are directed towards organizing a given message based on a determination of whether the message is spam or some other type of message. As such, classifiers referred to herein may also be known as "message filters," or, sometimes, "spam filters." Such classifiers or "message filters" may employ a variety of mechanisms to make such a determination including, but not limited to examining message headers, from addresses, message routing information, message content (e.g., a message body), a message attachment, or the like.

Message filters may employ a variety of approaches to organize messages, including, but not limited to artificial intelligence approaches, various machine learning algorithms, or the like. Non-exhaustive examples include Naïve Bayes, Support-Vector machines, logistic regression, perceptrons, Markovian discrimination approaches, neural networks, decision trees, or the like. Further, each of these algorithms may be employed different variations, such as regularization, feature weighting, or the like. Non-exhaustive examples of such classifiers include, but are not limited to CRM114 Discriminator, POPFile, DSPAM, SpamAssassin, SpamBayes, or the like.

As used herein, the terms "memory-resident only," or "exclusively memory-resident," and similar phrases, refer to computer-exectuable instructions and/or data that is configured to reside within non-persistent memory within a computering device and are unable to be located or re-located to persitent computer-readable storage media. Random Access Memory (RAM) is one non-exhaustive example of a non-persistent computer-readable memory store, while a hard disk drive is one non-exhaustive example of a persistent computer-readable store. The memory-resident only computer program and/or data may include a flag, a code test, or the like, that is arranged to prevent copying, moving, or other operating system activities to be performed upon it to locate/re-locate the program and/or data to persistent storage media.

As used herein, the term "client" refers to a computer's general role as a requester of data or services, and the term "server" refers to a computer's role as a provider of data or services. In general, it is possible that a computer can act as a client, requesting data or services in one transaction and act as a server, providing data or services in another transaction, thus changing its role from client to server or vice versa.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards employing a multi-pass message filtering approach that is trained during a first pass based on a result of a previously applied message filter that sorts messages into various message folders for a user. In one embodiment, the previously applied message filter employs a different classifier than used by the multi-pass message filter in the first pass. For example, in one embodiment, the previously applied message filter may be a client based filter, a server based filter, and/or a combination of client and server based filter. Thus, the previously applied message filter may maintain classification model data on the client device, on a server device, and/or both the client and server devices. Such classification model data may persist such that when the previously applied message filter has completed its classification actions, the classification model data remains available for subsequent uses. Thus, the multi-pass message filter is configured distinct from the previously applied message filter.

In one embodiment, the multi-pass message filter iterates through the message folders, aggregating information about the messages, to generate a classification model of data useable in a second pass classification of the messages. In one embodiment, the first pass of the multi-pass message filter scans messages in a user's inbox, spam folder, junk folder, and reads various information within the messages, including, but not limited to sender information, headers information, including a subject, an originating network address, message contents, attachments, and the like. In one embodiment, which message folder a message currently resides based on the previous message filter's actions is also employed in the generation of the classification model data. After creating or otherwise generating the temporary classification model comprising classification data, the classifier uses the temporary classification model data in a second pass on the message folders to retrospectively inspect the messages and present to the user a list of messages that might be reclassified. Thus, the multi-pass message filter is directed towards analyzing a result of another message filtering mechanism and providing recommendations for correcting oversights of the other message filter.

Throughout the entire multi-pass analysis, at least the classification model for the multi-pass message filter, including the classification data, is maintained within non-persistent memory on a user's client device, and is not stored on disk or within another persistent data store. Thus, the classification model data is exclusively memory-resident. After the recommendations are provided, the classification model and/or any related data is purged from memory. In this manner, the classification model is unavailable to others, minimizing a likelihood that a user's privacy might be compromised. Thus, in one embodiment, the classification model data for the multi-pass message filter is a temporary. In one embodiment, the multi-pass message filter may be implemented as a plug-in to a user's web browser, downloadable from a website, or accessible from within a client device's messaging client, or the like.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, client devices 101-104, and Message Services with Multi-pass Filtering (MSMF) 106.

One embodiment of a client device usable as one of client devices 101-104 is described in more detail below in conjunction with FIG. 2. Generally, however, client devices 102-104 may include virtually any mobile computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. Client device 101 may include virtually any computing device that typically connects using a wired communications medium such as personal computers, multiprocessor systems, microprocessor-based or programmable consumer electronics, network PCs, or the like. In one embodiment, one or more of client devices 101-104 may also be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

Client devices 101-104 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these message protocols, and virtually any other message protocol may be employed.

Client devices 101-104 may further be configured to include a client application that enables the user to log into a user account that may be managed by another computing device, such as MSMF 106, or the like. Such user account, for example, may be configured to enable the user to receive emails, send/receive IM messages, SMS messages, access selected web pages, or participate in any of a variety of other social networking activity. However, managing of messages or otherwise participating in other social activities may also be performed without logging into the user account.

A user of client devices 101-104 may employ any of a variety of client applications to access content, read web pages, receive/send messages, or the like. In one embodiment, each of client devices 101-104 may include an application, or be associated with an application that resides on the client device or another network device, that is useable to filter received messages. In one embodiment, the message filter might reside remotely on a content server (not shown), a messaging server, such as MSMF 106, or the like. In one embodiment, the message filter might perform traditional message filtering to sort messages into one or more message folders, such as an inbox, spam box, junk box, bulk box, or the like, where each of the message folders are associated with one or more messaging clients. Such traditional message filters typically generate and/or otherwise employ classification data that may be based on a set of rules, policies, or the like, that may be configured for a plurality of client devices. Thus, such classification data might be sharable for use for analyzing and sorting messages for the plurality of client devices. Moreover, because such classification data might be re-useable, it is often stored in a persistent data store for future modifications and/or use. In another embodiment, where the classification data might be generated and used for a single client device, it may still be re-used a plurality of times. As such, the classification data is again stored in a persistent data store. Such, traditional classification data stored in persistent data stores may remain exposed for hacking, and/or other acts that may invade a user's privacy. This is often the case, where the classification data includes, for example, unique information about the recipient user, including, but not limited to information the user might prefer to remain private. This information might reside within the classification data as keywords, tags, headers, or the like, that the traditional message filter might later employ to evaluate subsequently received messages. In any event, messaging clients that employ such traditional message filters may include, but are not limited to email clients, IM clients, SMS clients, VOIP clients, or the like.

Client devices 101-104 may select to have a multi-pass message classifier (or message filter) further analyze the message folders. In one embodiment, such selection may be performed automatically, independent of a user action. However, in another embodiment, a user might be provided with an icon, button, widget, script, or the like, that enables the user to select and execute the multi-pass message filter. In one embodiment, the multi-pass message classifier (or filter) might be downloadable onto one of the client devices for execution locally. In another embodiment, the multi-pass message classifier might reside on a remote network device, such as MSMF 106.

In any event, the multi-pass message classifier might perform multi-pass filtering of the message folders, where in a first pass, it generates multi-pass classification model data that remains exclusively within a non-persistent memory data store. The multi-pass classification model data includes keywords, phrases, weighting factors, scores, parameters, and/or other data useable by the multi-pass message classifier to analyze the message folders and provide information about possible misclassifications of messages in a second pass.

The classification model data represents a result of training the multi-pass message classifier for a specific set of messages within at least one message folder. For example, based on a result of where messages have been sorted by a previous message filter, the multi-pass message classifier may employ such information to generate its classification model data.

The classification model data for the multi-pass message classifier (filter) may also include keywords, phrases, identifiers, addresses, and/or other information that a user might consider private and/or confidential to the user. In one embodiment, the multi-pass classification model data may be created to be memory resident exclusively, such that the model is unable to be located and/or re-located to non-persistent memory. Maintaining such data as memory resident might be achieved through any of a variety of ways, including, but not limited to employing special operating system switches, flags, or the like, that restrict where the multi-pass classification model data might reside. Upon usage of the multi-pass message classifier, the classification model data and any other data from the first pass may be purged from memory, in a manner that is directed towards not leaving a trace on any persistent and/or non-persistent data store.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple MSMF 106, and client device 101 with other computing devices, including through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

MSMF 106 includes virtually any network computing device that is configured to manage messages received over a network. In one embodiment, MSMF 106 may include a message server that is configured to receive messages and route them to an appropriate client device, or the like. Thus, MSMF 106 may include a message transfer manager to communicate a message employing any of a variety of email protocols, including, but not limited to, Simple Mail Transfer Protocol (SMTP), Post Office Protocol (POP), Internet Message Access Protocol (IMAP), NNTP, and the like. However, MSMF 106 may also include a message server configured and arranged to manage other types of messages, including, but not limited to SMS, MMS, IM, or the like.

MSMF 106 may further include one or more message classifiers useable to classify received messages and organize or sort them into different message folders based, in part, on the classification. Such classification may include predictions that the message is a spam message, a bulk message, a ham message, or the like. MSMF 106 may then send the message to a message folder based on the classification.

MSMF 106 may further provide access to a multi-pass message filter for use by one or more client devices 101-104. In one embodiment, the multi-pass message filter might be configured to be a downloadable component onto a client device. However, in another embodiment, the multi-pass message filter might be configured to reside on MSMF 106, while generating its multi-pass classification model data on a client device, in improve privacy of such data.

Devices that may operate as MSMF 106 include, but are not limited to personal computers, desktop computers, multiprocessor systems, microprocessor-based or programmable consumer electronics, network PCs, servers, network appliances, and the like.

Although MSMF 106 is illustrated as a distinct network device, the invention is not so limited. For example, a plurality of network devices may be configured to perform the operational aspects of MSMF 106. For example, in one embodiment, the message classification may be performed within one or more network devices, while the message server aspects useable to route messages may be performed within one or more other network devices.

Illustrative Client Environment

Figure 2:
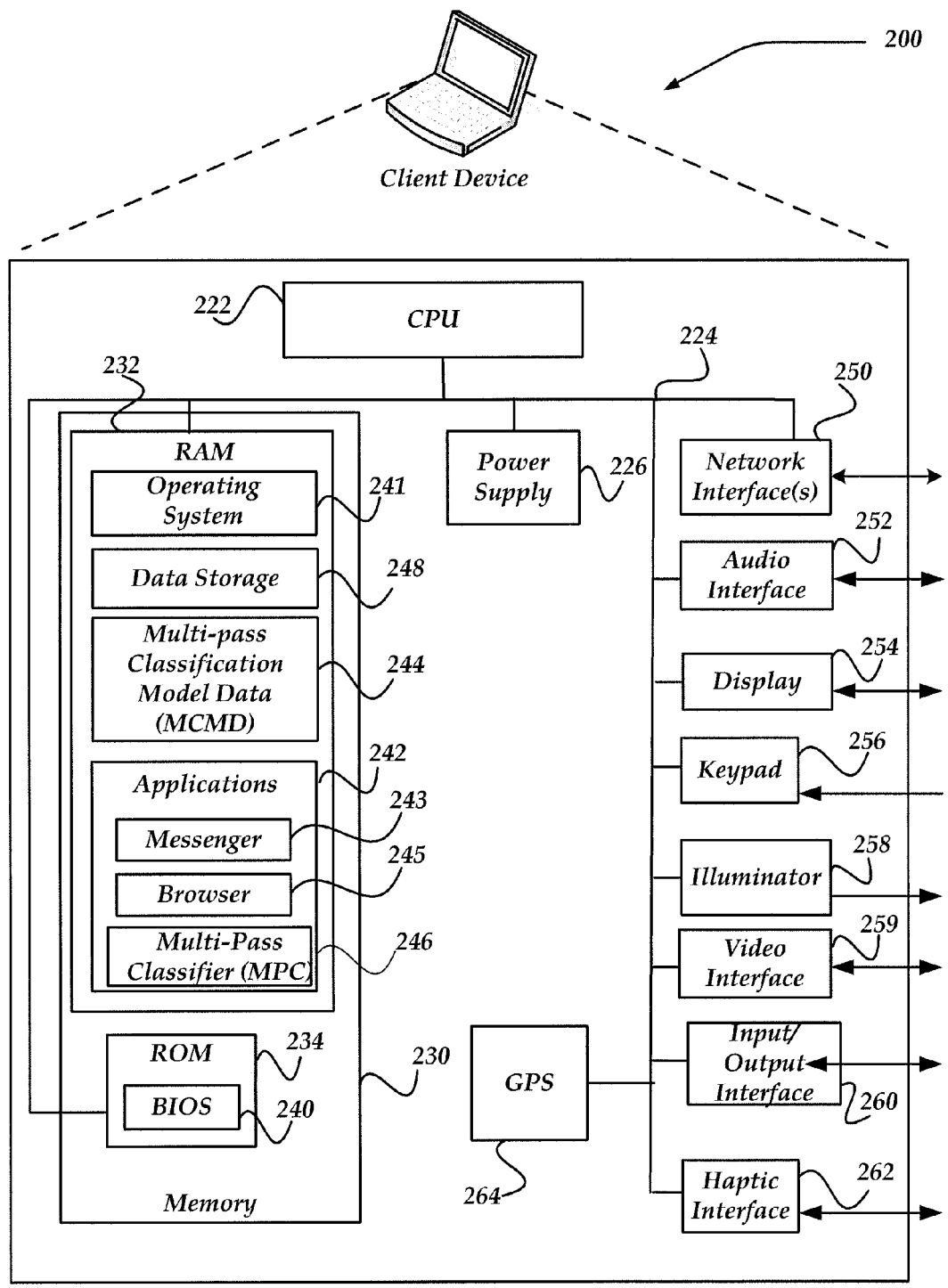
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one of client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, r any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer readable storage media for storage of information such as computer readable instructions, data structures, program modules, or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 248, which can be utilized by client device 200 to store, among other things, applications 242 and/or other data. For example, data storage 248 may also be employed to store information that describes various capabilities of client device 200, as well as store an identifier. The information, including the identifier, may then be provided to another device based on any of a variety of events, including being sent as part of a header during a communication, sent upon request, or the like. In one embodiment, the identifier and/or other information about client device 200 might be provided automatically to another networked device, independent of a directed action to do so by a user of client device 200. Thus, in one embodiment, the identifier might be provided over the network transparent to the user.

Moreover, data storage 248 may also be employed to store personal information including but not limited to contact lists, personal preferences, data files, graphs, videos, or the like. Data storage 248 may further provide storage for user account information useable with one or more message addresses, message folders, or the like. Thus, data storage 248 may include various message storage capabilities to store and/or otherwise manage message folders, such as email folders for spam messages, ham messages, bulk messages, inbox messages, deleted messages, or the like. In one embodiment, data storage 248 may also store and/or otherwise manage message classification data from traditional message filters. At least a portion of the information may also be stored on a disk drive or other storage medium (not shown) within client device 200.

Applications 242 may include computer executable instructions which, when executed by client device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications 242 may include, for example, messenger 243, browser 245, multi-pass message classifier (MPC) 246, and multi-pass classification model data (MCMD) 244.

Browser 245 may include virtually any client application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may also be employed.

Messenger 243 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, or the like. In another embodiment, messenger 243 may be a client application that is configured to integrate and employ a variety of messaging protocols. In one embodiment, messenger 243 may employ various message boxes or folders to manage and/or store messages.

MPC 246 represents a message classifier that is configured to reside on a client device, and to generate temporary MCMD 244 in a first pass through message folders and to employ the generated temporary MCMD 244 to identify potentially misclassified messages in the message folders in a second pass through the message folders. In one embodiment, MPC 246 provides a display of the misclassified messages to a user of client device 200 to enable the user to move the misclassified messages to another message folder. In one embodiment, MPC 246 might provide the display of the misclassified messages in a list of messages. However, the invention is not so limited, and in another embodiment, the identified messages as being misclassified might by uniquely marked to be readily identifiable within the message folders. Such markings may include but is not limited to highlighting, color coding, placing a symbol, text, or the like, next to the identified message, or the like. The invention may, in still another embodiment, configure MPC 246 with an option that a user may select resulting in automatic movement of misclassified messages into another message folder.

Furthermore, upon display or other presentation of the identified misclassified messages to a user, MPC 246 is configured to delete MCMD 244 from client device 200. In one embodiment, such deletion might employ secure mechanisms such that MCMD 244 might not readily be recovered using various hacking mechanisms, operating system recovery mechanisms, or the like. For example, MPC 246 might employ various write-over mechanisms to securely purge the client device 200 of MCMD 244. However, the invention is not so limited, and other mechanisms may also be employed, including, but not limited to mechanisms that might employ minimal file deletion techniques. In one embodiment, MPC 246 might employ a process substantially similar to process 400 described in more detail below in conjunction with FIG. 4.

Illustrative Network Device Environment

Figure 3:
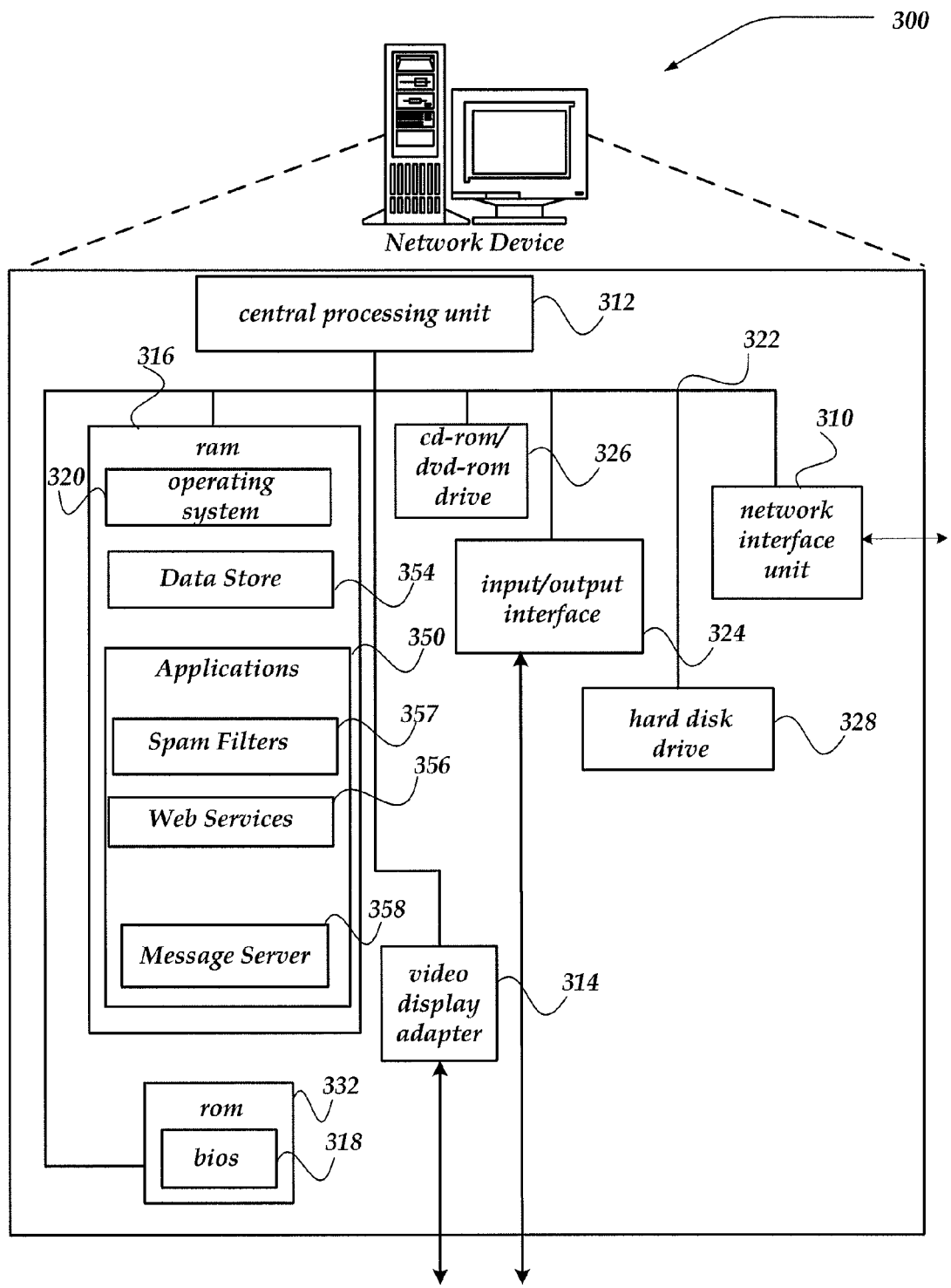
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, MSMF 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. For example, mass memory might include data store 354. Data store 354 may be include virtually any mechanism usable for store and managing data, including but not limited to a file, a folder, a document, or an application, such as a database, spreadsheet, or the like. Data store 354 may manage information that might include, but is not limited to web pages, information about members to a social networking activity, contact lists, identifiers, profile information, tags, labels, or the like, associated with a user, as well as scripts, applications, applets, and the like.

One or more applications 350 may be loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth. Applications 350 may include web services 356, Message Server (MS) 358, and message (spam) filters 357.

Web services 356 represent any of a variety of services that are configured to provide content, including messages, over a network to another computing device. Thus, web services 356 include for example, a web server, messaging server, a File Transfer Protocol (FTP) server, a database server, a content server, or the like. Web services 356 may provide the content including messages over the network using any of a variety of formats, including, but not limited to WAP, HDML, WML, SMGL, HTML, XML, cHTML, xHTML, or the like. In one embodiment, web services 356 may interact with spam filters 357 and/or message server 358 when a client device requests a message.

Message server 358 may include virtually any computing component or components configured and arranged to forward messages from message user agents, and/or other message servers, or to deliver messages to a local message store, such as data store 354, or the like. Thus, message server 358 may include a message transfer manager to communicate a message employing any of a variety of email protocols, including, but not limited to, Simple Mail Transfer Protocol (SMTP), Post Office Protocol (POP), Internet Message Access Protocol (IMAP), NNTP, or the like.

However, message server 358 is not constrained to email messages, and other messaging protocols may also be managed by one or more components of message server 358. Thus, message server 358 may also be configured to manage SMS messages, IM, MMS, IRC, mIRC, or any of a variety of other message types.

In one embodiment, message server 358 and/or web services 356 may enable employ spam filters 357 to organize or sort messages for a user account into message folders based on a message classification. Spam filters 357 represent therefore, at least one message classifier, useable to review messages and to sort the messages into various message folders. In one embodiment, spam filters 357 may initially generate message classification data based on pre-defined rules, procedures, keywords, policies, or the like. For example, in one embodiment, a system administrator might provide information usable as classification data by spam filters 357 indicating that an image is spam based on a keyword, policy, size, or the like. Such information might be pre-loaded loaded into the classification data, which may be stored in a persistent data store, such as on hard disk drive 328, or the like. In another embodiment, spam filters 357 might dynamically modify its classification data based on a client device's messages, however, the resulting classification data remains configured as persistent data reusable a plurality of subsequent times.

Generalized Operation

Figure 4:
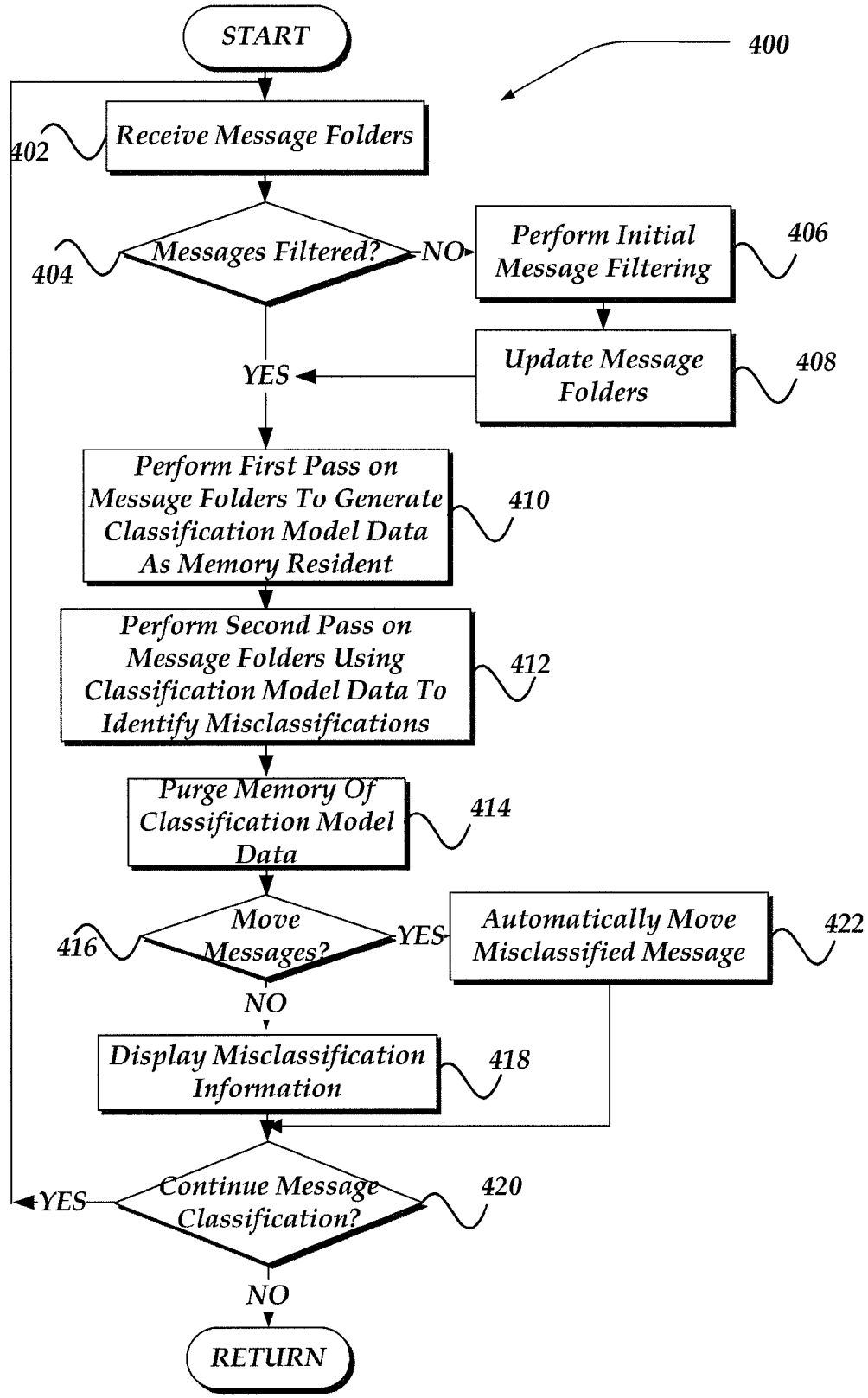
FIG. 4 illustrates a logical flow diagram generally showing one embodiment of a process for performing multi-pass message filtering using a memory-resident classification model.

The operation of certain aspects of the invention will now be described with respect to FIG. 4. FIG. 4 illustrates a logical flow diagram generally showing one embodiment of a process for performing multi-pass message filtering using a non-persistent, exclusively memory-resident classification model. Moreover, because the multi-pass filtering is performed after another message filter has moved or sorted messages into various message folders, the multi-pass filter performs a quality inspection on results by other message filters, and catching misclassifications by the first message filter so they may be readily corrected.

Process 400 of FIG. 4 begins, after a start block, at block 402, where message folders that include a plurality of messages sorted into one or more of the message folders. As noted above, the message folders may include, but are not limited to inbox folders, delete folders, spam folders, suspect folders, bulk folders, junk folders, or the like.

Processing flows next to decision block 404 where a determination is made whether a first message filter, such as a traditional message filter as described above, has sorted the messages into message folders. Such determination might be made based on receiving a flag, examining the message folders to determine if readily detectable spam messages remain in an inbox, or the like. For example, if no messages reside in other than a delete folder, and/or inbox folder, an assumption may be made that an initial message filtering is not yet performed. In any event, if it is determined that initial message filtering is to be performed to sort the messages into message folders, processing flows to block 406; otherwise, processing flows to block 410.

At block 406, initial message filtering is performed using a first message filter and first message classification data, configured to be persistent. Processing flows next to block 408, where the classified messages may be moved to one or more of the plurality of message folders. Processing continues next to block 410.

At block 410, a first pass analysis is performed by the multi-pass message filter that is configured to generate a second classification model data based on the first pass, where the generated second classification model data is configured to reside exclusively in a non-persistent memory location on a client device. In one embodiment, information about which message folder a message resides may be used to generate the second classification data. However, other information may also be used, including, but not limited to the information mentioned above.

Continuing next to block 412, using the generated second classification model data, the multi-pass message filter performs a second pass on the sorted plurality of messages to generate a misclassification identification for the sorted messages.

Process 400 flows next to block 414, where in one embodiment, the second classification model data generated at block 410 is deleted or purged from the memory of the client device. In another embodiment, the second classification model data might be deleted after block 416, or block 420, without departing from the scope of the invention. However, in each instance, the second classification model data is deleted.

Processing continues to decision block 416, where a determination is made whether to display information about the misclassified messages or to automatically move the misclassified messages. In one embodiment, such determination may be based on a user selection. Thus, if the misclassified messages are to be displayed to the user, processing flows to block 4181; otherwise, processing flows to block 422, where the misclassified messages may be automatically moved to another message folder. Processing then flows from block 422 to decision block 420.

At block 418, the misclassified messages may be displayed to the user employing any of a variety of mechanisms, including, but not limited to those described above. The user may then select to leave the messages where they currently reside, or move one or more of them. Processing then flows to decision block 420.

At decision block 420 a determination is made whether more message classifications are to be performed. Such may be the case, for example, where more messages have been received by a server, or the like, that have not yet been classified. If there are more messages, process 400 may loop back to block 402 to continue processing.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device to manage a delivery of a message over a network, comprising:
a transceiver to send and receive data over a network; and
a processor that is operative to perform actions, comprising:
performing a first pass analysis on a plurality of messages, which have been previously sorted into a plurality of different message folders by a first message filter, using a second, multi-pass message filter that is configured to generate a classification model based on the first pass analysis, wherein the generated classification model is configured to reside exclusively in a non-persistent memory location;
using the generated classification model with the second, multi-pass message filter to perform a second pass on the sorted plurality of messages, to generate a misclassification identification of sorted messages;
displaying the misclassification identification of sorted messages such that at least one misclassified message can be moved to a different message folder based on the misclassification identification; and purging the generated classification model from non-persistent memory location.

2. The network device of claim 1, wherein performing a first pass analysis on the sorted plurality of messages is configured to train the second, multi-pass message filter based on which folder each of the plurality of messages resides.

3. The network device of claim 1, wherein the generated classification model is generated based on an analysis of at least which message folder a message currently resides.

4. The network device of claim 1, wherein the classification model is generated based on an analysis of at least one of a state of a message, whether a message sender's address in an address book associated with a recipient that is associated with the message folders, a header of a message, or a message content.

5. The network device of claim 1, wherein access to the generated classification model is restricted.

6. A processor readable storage medium that includes data and instructions, wherein the execution of the instructions on a computing device provides for managing messages by enabling actions, comprising:
receiving a plurality of messages;
sorting the plurality of messages into a plurality of different message folders using a first message filter, wherein the first message filter is configured to store first classification data in a persistent store;
executing a first pass of a multi-pass message filter on the sorted plurality of messages to train the multi-pass message filter by generating second classification data, wherein the second classification data is configured to reside exclusively in a non-persistent memory store;
using the second classification data, executing a second pass of the multi-pass message filter on the sorted plurality of messages to score each message;
identifying any message in the plurality of messages that based on the message's respective score indicates that the message is sorted into an incorrect message folder; and
providing a display of information associated with any message identified as stored into the incorrect message folder, such that a user is enabled to move the identified message to another message folder.

7. The processor readable storage medium of claim 6, wherein the instructions enable actions, further comprising deleting second classification data such that it is no longer accessible.

8. The processor readable storage medium of claim 6, wherein executing the first pass and the second pass of the multi-pass message filter occurs entirely on a client device.

9. The processor readable storage medium of claim 6, wherein the first message filter is configured to execute on a network device distinct from a client device.

10. The processor readable storage medium of claim 6, wherein the multi-pass message filter employs a Naive Bayes classifier.

11. The processor readable storage medium of claim 6, wherein the generated second classification model is generated based on an analysis of at least which message folder a message currently resides.

12. A method for managing a message delivery, comprising:
receiving a plurality of messages;
sorting the plurality of messages into a plurality of different message folders using a first message filter, wherein the first message filter is configured to store first classification data in a persistent store;
executing, on a client device, a first pass of a multi-pass message filter on the sorted plurality of messages to train the multi-pass message filter by generating second classification data, wherein the second classification data is configured to reside exclusively in a non-persistent memory store;
using the second classification data, executing on the client device a second pass of the multi-pass message filter on the sorted plurality of messages to score each message;
identifying any message in the plurality of messages that based on the message's respective score indicates that the message is sorted into an incorrect message folder; and
providing a display of information associated with any message identified as stored into the incorrect message folder, such that a user is enabled to move the identified message to another message folder.

13. The method of claim 12, wherein the second classification data is deleted from the client device upon providing the display of information.

14. The method of claim 12, wherein the multi-pass message filter is selectable for execution by a user through an interface on the client device; and wherein the first message filter is automatically executed independent of a user action.

15. The method of claim 12, wherein the second classification data is generated based on an analysis of at least one of a state of a message, whether a message sender's address in an address book associated with a recipient that is associated with the message folders, a header of a message, or a message content.

16. The method of claim 12, wherein the second classification data is generated based on which folder each of the plurality of messages resides.

17. A system for enabling a communications over a network, comprising:
a network device configured to perform actions, including:
receiving a plurality of messages;
assigning the plurality of messages to a plurality of different message folders using a first message filter, wherein the first message filter is configured to store first classification data in a persistent store; and
communicating the messages over the network to the plurality of different message folders; and
a client device configured to perform actions, including:
executing a first pass of a multi-pass message filter on the sorted plurality of messages to train the multi-pass message filter by generating second classification data, wherein the second classification data is configured to reside exclusively in a non-persistent memory store at the client device;
using the second classification data, executing a second pass of the multi-pass message filter on the sorted plurality of messages to score each message;
identifying any message in the plurality of messages that based on the message's respective score indicates that the message is sorted into an incorrect message folder; and
providing a display of information associated with any message identified as stored into the incorrect message folder, such that a user is enabled to move the identified message to another message folder.

18. The system of claim 17, wherein the second classification data is deleted from the client device upon providing the display of information.

19. The system of claim 17, wherein execution of the multi-pass message filter is user selectable.

20. The system of claim 17, wherein the second classification data is generated based on an analysis of at least one of a state of a message, whether a message sender's address in an address book associated with a recipient that is associated with the message folders, a header of a message, or a message content.

* * * * *